May 30, 1967 R. E. WILLIAMS 3,322,891

COLOR SEPARATOR WITH POSITIVE FEEDBACK TO CHROMINANCE AMPLIFIER DURING FLYBACK

Filed Jan. 29, 1964 3 Sheets-Sheet 1

INVENTOR.

RICHARD E. WILLIAMS

BY

Hurwitz & Rose

May 30, 1967 R. E. WILLIAMS 3,322,891

COLOR SEPARATOR WITH POSITIVE FEEDBACK TO CHROMINANCE AMPLIFIER DURING FLYBACK

Filed Jan. 29, 1964 3 Sheets-Sheet 2

INVENTOR.
RICHARD E. WILLIAMS
BY
Hurvitz & Rose

INVENTOR.
RICHARD E. WILLIAMS
BY
Hurvitz & Rose 3,322,891

COLOR SEPARATOR WITH POSITIVE FEEDBACK TO CHROMINANCE AMPLIFIER DURING FLY-BACK

Richard E. Williams, Fairfax, Va., assignor to Scope, Incorporated, Falls Church, Va., a corporation of New Hampshire Filed Jan. 29, 1964, Ser. No. 341,019
10 Claims. (Cl. 178—5.4)

This invention relates to a color television subcarrier signal processor, and more particularly to a circuit in which a low level synchronous detector is combined with gated stages, so as to minimize the number of components required in a color television receiver.

Standards presently in effect for color television transmission in the United States call for a reference subcarrier burst located on a horizontal line synchronization pedestal, and hue information carried as a related phase of an identical subcarrier frequency embedded in the picture information. Such standards are set forth in the National Television System Committee Specifications, as published in the Proceedings of the IRE, January 1954, pages 17 thru 19. The specified color subcarrier frequency is 3,579,-545 m.c., and 8 or more cycles of that frequency are carried in the reference burst riding the horizontal pedestal. It is thus the case that the reference burst is available at the color television receiver for two or three microseconds of each horizontal scanning line. Present standards give a horizontal scanning interval of approximately 63 microseconds, thus necessitating a circuit in the receiver to ring out the burst throughout at least this interval while maintaining phase coherence. Synchronous detection must also be effected between the chroma subcarrier and the extended reference burst. Accordingly, it has become conventional practice to separate the composite video signal into two amplification and processing channels; one for the reference subcarrier processing, and the other for chrominance signal amplification and processing. Only after both signals have been properly amplified and processed are they combined in one or more synchronous detectors to yield the detected chrominance signal. As a result, the aforementioned amplification and processing functions in a color television receiver typically employ six or more active elements such as tubes or transistors. It is desirable to reduce this complexity without introducing cross-talk or compromising the processing effectiveness for either reference or chroma subcarriers.

It is therefore an object of the present invention to provide a simplified means for processing reference and chroma subcarrier signals in a color television receiver.

It is another object of the invention to exploit the interleaved occurences of reference burst and chrominance signals, so that they can be efficiently processed in common circuits without cross talk.

It is yet another object of the invention to provide simple means for adjusting the bandwidth of a dual purpose amplifier, to better meet the requirements of the reference signal processing and the chroma signal processing, respectively, in a time-shared fashion.

It is still a further object of the invention to perform the function of synchronous detection via an additive, rather than the usual multiplicative process.

For a better understanding of the invention, together with other and further objects thereof, reference is made to the following detailed description taken in connection with the accompanying drawings, in which.

Figure 1:
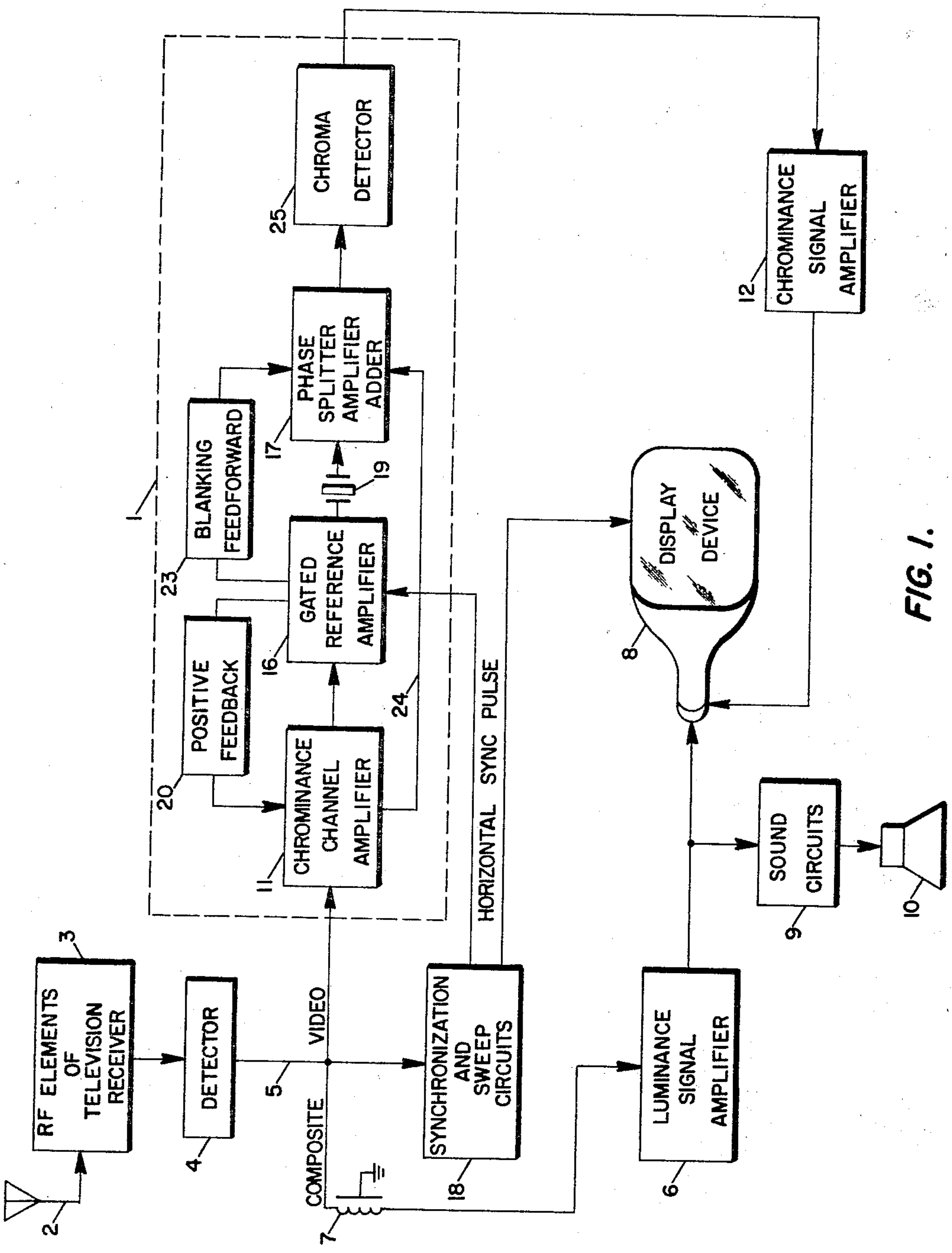
FIGURE 1 is a block diagram of a television receiver embodying a preferred embodiment of the present invention.

In FIGURE 1, a block diagram of an embodiment of the present invention, generally indicated as 1, is shown in relationship to conventional components of a color television receiver. The receiver intercepts transmitted signals via an antenna 2, processes the signals through conventional RF elements 3 comprised of a tuning head and an IF strip, and produces the video modulation components by means of a video detector 4. The output bus of the detector 5, as in conventional and modern color TV receivers (NTSC) includes sound components, luminance components, and chrominance components. The luminance components, which extend in frequency from zero to approximately 3 m.c., are extracted by means of a luminance signal amplifier 6 after passing through a delay line 7. Pursuant to principles well known to those skilled in the art, the delay provided by delay line 7 is arranged to insure that the luminance signal components arrive at the display device 8 in synchronization with the chrominance components that are implicitly delayed as a result of narrow-bandwidth chrominance processing.

The 4.5 m.c. sound components of the composite video signals may be extracted as audio signals from the output of the luminance signal amplifier in conventional fashion, by elements 9 and radiated by speaker 10. The exact location of the sound elements 9 and 10 in the overall system is unimportant to the present invention however, and other sound extraction arrangements may be employed.

The chroma channel components of the NTSC signal are carried as sidebands on a 3.58 m.c. subcarrier. These components are processed by the circuits of the present invention, included in block 1, to yield demodulated color signals containing frequencies between approximately 5 c.p.s. and 1 m.c. The latter signals are amplified in a chrominance signal amplifier 12 and applied to the display device 8, so as to overlay the luminance signals derived from the luminance signal amplifier 6.

Figure 2:
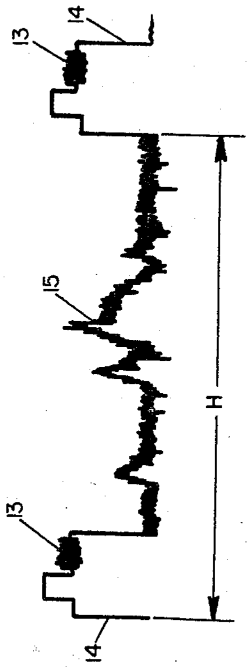
FIGURE 2 is a waveform of a typical horizontal line scan showing the reference burst.

The composite video waveform at the detector output 5 takes an appearance similar to that of FIGURE 2 when observed over a single horizontal line scan interval. A 3.58 mc. reference burst 13 rides the back porch of the horizontal pedestal 14. The horizontal pedestal 14 is contemporaneous with the horizontal retrace blanking of the display device 8, and thus no picture elements of interest lie within the transmitted time interval represented by the horizontal pedestal 14. Hue information during a horizontal scanning line is carried in the form of phase of a 3.58 mc. subcarrier embedded in the picture information 15 interleaved between horizontal blanking pedestals 14. For a number of reasons, thoroughly discussed in the literature and therefore not repeated, the 3.58 mc. embedded color subcarrier is not easily seen by the viewer watching the face of the display device 8, but relatively low frequency components produced by synchronously demodulating the signal component 15 containing the chrominance subcarrier against a time extended version of the reference burst 13, comprise the desired low frequency color signal.

The system of the present invention, embodied in block 1, initially time-extends and amplifies the reference burst 13 without generating crosstalk with the signal component 15. It additionally amplifies the signal component 15 and combines it with the extended reference burst for synchronous demodulation and phase comparison purposes. While performing these functions it discriminates against sound subcarrier interference and demonstrates high immunity to noise.

The novel signal processor of the invention is comprised of three active elements, a chrominance channel amplifier 11, a gated reference amplifier 16, and a phase-splitter amplifier adder 17. No more than two of these three active elements are operative at any given time. Their respective activation is controlled by means of a horizontal synchronization pulse derived from the receiver synchronization and sweep circuits 18. The sweep circuits 18 are conventional, and the aforementioned horizontal sync pulse can be obtained from the oscillator or amplifier circuits, conventional per se, associated with horizontal deflection functions of the television display. It is merely necessary, to this end, that the horizontal sync pulse approximately coincide with the horizontal blanking pedestal 14, of FIGURE 2. The pulses are used to "enable" the gated reference amplifier 16, which otherwise is in "off" state. During the interval that the gated reference amplifier 16 is enabled, the phase splitter amplifier adder 17 is disabled; thus, the amplifiers 16 and 17 are never concurrently enabled, and in effect operate alternately.

Figure 4:
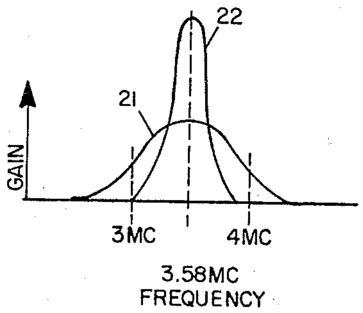
FIGURE 4 is a plot of a bandpass characteristic exhibited by components of the circuit of FIGURE 3.

The composite video signal at the output of the detector 4 is amplified and filered by the chrominance channel amplifier 11. The chrominance channel amplifier 11 normally has a bandwidth extending from approximately 3 mc. to 4.2 mc., or about 600 kc. each side of the 3.58 mc. color subcarrier. This bandwidth is suitable for carrying the essential color information. The output of the chrominance channel amplifier 11 is supplied to both the gated reference amplifier 16 and the phase splitter amplifier adder 17. During the horizontal synchronization pulse the gated reference amplifier 16 is enabled, and the only component of the composite video signal simultaneously passing through the chrominance channel amplifier 11 is the reference burst 13. The reference burst is fed back regeneratively to the chrominance channel amplifier 11 by means of a positive feedback network 20. The regenerative feedback causes the bandwidth of the circuit encompassed by the feedback to decrease and the gain to rise. The action is similar to that of the well-known Q multiplier, except in that the present invention the Q multiplier is selectively multiplied only during the horizontal sync pulse interval. Referring to FIGURE 4, the curve 21 represents the bandpass and gain characteristics of the circuit without positive feedback and curve 22 the same characteristics with the positive feedback. Curve 22 is effective during the horizontal sync pulse, whereas curve 21 is effective at all other times.

The reference burst 13 of FIGURE 2 is highly amplified as a result of the regenerative action of the positive feedback network and is applied to a crystal filter 19. The crystal 19 exhibits a very high Q; e.g., 20,000 or more, and in accordance with transient analysis of such high Q circuits will cause the reference burst 13 to continue ringing out long after the burst itself disappears. The crystal filter 19 is tuned precisely to the color subcarrier frequency and serves to maintain both frequency and phase coherence during the ring-out interval. The reference burst 13 of FIGURE 2 is essentially converted to a steady state sinusoidal signal by the action of the amplifiers 11 and 16, the positive feedback network 20 and the crystal filter 19.

During the time that the crystal 19 is excited by the reference burst 13, a blanking feedforward circuit 23 disables the phase splitter amplifier adder circuit 17. Because the circuit 17 is disabled, it is possible to connect the output of the chrominance channel amplifier 11 to the adder 17 without incurring deleterious crosstalk during the reference burst interval. Without the blanking feedforward circuit 23, it is possible for the phase splitter amplifier adder circuit 17 to produce a signal component at the color subcarrier frequency, which would deleteriously add or subtract from the reference burst being processed through the chrominance channel amplifier 11. The blanking feedforward circuit 23 in effect eliminates the need for a buffer between the chrominance channel amplifier 11 and the phase splitter amplifier adder 17.

Between horizontal sync pulses the gated reference amplifier 16 is "off." As a result, the positive feedback via the network 20 is ineffective and the broader passband 21 of FIGURE 4 is observed in the chrominance channel amplifier 11. The broader pass band 21 is necessary to accommodate the color subcarrier and sidebands thereon corresponding to chroma modulation. In this, the second mode of the invention, the chrominance channel amplifier 11 adds its output via bus 24 to the steady-state sinusoidal output of the crystal 19 in the amplifier adder 17. A chroma detector 25 synchronously extracts the resulting envelope that carries the low frequency color information. The detected output is amplified in a chrominance signal amplifier 12 and applied to the display device 8, in conventional fashion.

The color processor 1 typically receives a signal from the detector output 5 having an amplitude of less than one volt peak-to-peak excursion. The processes of reference burst isolation and ring-out, chrominance channel amplification, and synchronous detection are all provided by the three active elements 11, 16 and 17 of the color processor, while maintaining a very high effective overall gain. The crystal ring-out device 19 typically imposes a fifty-to-one loss since its output energy cannot exceed its input; i.e., the time stretch-out imposes amplitude loss. Despite this loss and detection losses, the present invention yields a signal at the output of the chroma detector 25 that exceeds the amplitude of the input chroma component on bus 5.

Figure 3:
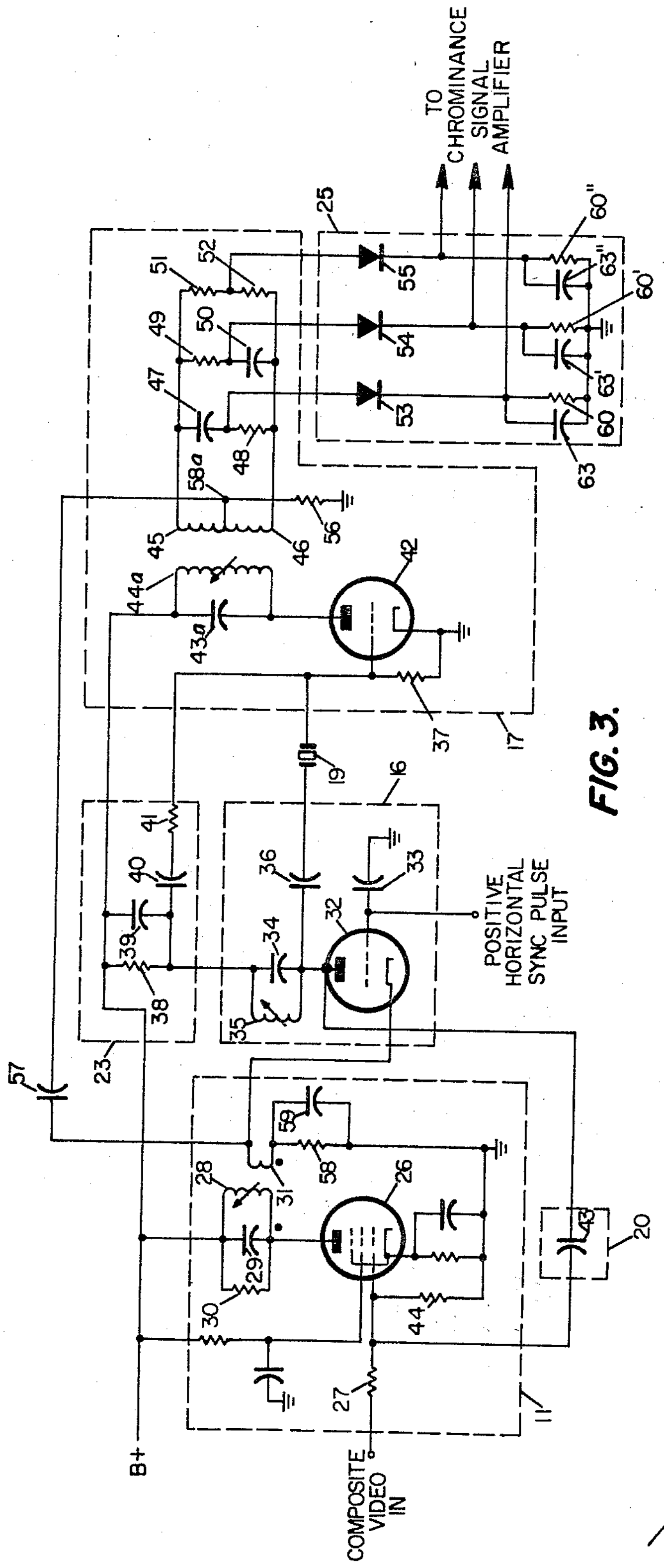
FIGURE 3 is a schematic circuit diagram of a preferred embodiment of the present invention.

The signal processor is shown in schematic circuit diagram in FIGURE 3, to which reference is now made. The chrominance channel amplifier 11 is comprised of a vacuum tube amplifier 26 whose control grid is connected to the composite video input via a source impedance, represented as 27.

The source impedance 27 may be the inherent impedance of the detector output 5 of FIGURE 1, a sound-trap resonant circuit, or any of the other similar impedances that may be observed in a video circuit. A tuned plate tank consisting of an inductance 28, capacitance 29, and a dissipation component 30 is tuned to the color subcarrier frequency, typically 3.58 mc., to yield a bandpass characteristic similar to that of 21 in FIGURE 4. A low impedance output such as that provided by the secondary winding 31, coupled to the plate tank coil 28, can be used to drive a low impedance load that may be presented by the gated reference amplifier 16. If the gated reference amplifier tube 32 is grid-driven the low impedance output is necessary.

The gated reference amplifier tube 32 is enabled by application of positive horizontal synchronization pulse to its control grid. A by-pass capacitor 33 enables the reference amplifier stage 32 to operate as a grounded-grid amplifier at the color subcarrier frequency. The capacitor 33 serves to by-pass the subcarrier frequency to ground, yet offers sufficient reactance at the relatively low frequencies attending the horizontal synchronization pulse so that the grid of tube 32 will follow the horizontal synchronization pulse. The cathode of the tube 32 is biased positively, close to cutoff, by the action of a large cathode resistor 58 and a large bypass capacitor 59. The reference amplifier stage 32 thus comes out of cutoff and acts as a grounded grid amplifier only when the horizontal synchronization pulse is applied to its grid. Since the cathode of the stage 32 is excited by the plate tank secondary 31 of the chrominance amplifier stage 26, the reference burst 13 of FIGURE 2 will appear highly amplified at the plate of the reference amplifier tube 32. A plate tank circuit consisting of capacitor 34 and inductor 35 is tuned approximately to the reference subcarrier frequency and serves to couple the reference burst via capacitor 36 to the ring-out crystal 19. The crystal 19 is operated in the series resonant mode and produces a time extended, essentially steady-state, ring-out across the low load resistor 37 of the phase splitter stage 17. The load resistor 37 is typically 1000 ohms or less, so that the very high Q of the series resonant crystal 19 can be realized. It is thus the case that upon repeated exposure to reference burst 13 that recurs for every horizontal line in the display; i.e., approximately 15,750 times per second under NTSC standards, the output of the ring-out crystal 19 will be of a substantially continuous-wave nature.

A low-pass plate load consisting of resistor 38 and capacitor 39 is also connected to the plate of the gated reference amplifier 32 via the low impedance (at low frequencies) of inductor 35. As a result, an inverted horizontal synchronization pulse is developed across resistor 38 and capacitor 39 and is coupled by a capacitor 40 and resistor 41 to the grid of the phase splitter amplifier 42. This negative-going pulse serves to cut off the phase splitter amplifier 42, whenever the gated reference amplifier 32 is enabled, and vice-versa. Thus, either stage 32 or amplifier 42 can be enabled, but not at the same time. In the embodiment shown in FIGURE 3, stage 32 is enabled during the horizontal sync pulse and amplifier 42 is enabled the remainder of the time. Resistors 38 and 41 and capacitors 39 and 40 constitute the blanking feedforward circuit 23 of FIGURE 1.

During the time that the gated reference amplifier 32 is enabled, the reference burst developed across the plate tank consisting of capacitor 34 and inductor 35 is fed back to the grid of the chrominance channel amplifier 26 via capacitor 43. The voltage divider circuit consisting of capacitor 43 in series with the combination of the source impedance 27 and grid return resistance 44 is chosen to yield the appropriate band pass characteristic 22 of FIGURE 4. This high gain, narrow bandwidth mode is activated only when the gated reference amplifier 32 is enabled, or during the horizontal sync pulse. At all other times the band pass of the chrominance channel amplifier 26 is roughly as shown by curve 21 in FIGURE 4.

The amplifier adder stage 42 serves as an amplifier only for the sinusoidal reference ring-out signal from the crystal 19. A plate tank circuit consisting of a capacitor *43a* and primary of a transformer *44a* is resonated to the color subcarrier frequency, thus developing an amplified version of the reference crystal 19 output. A tapped secondary on the transformer *44a* is comprised of windings 45 and 46 surrounding a tap point *58a*. For purposes of exposition, it will be assumed that the tap point *58a* is the center tap; i.e., that windings 45 and 46 are balanced. However, it will be seen as the description progresses that the tap point *58a* need not be precisely at the center of a secondary winding.

Between horizontal pedestals 14 the picture waveform containing color subcarrier information 15 is present on the secondary 31 of the chrominance channel amplifier plate tank inductor 28. The waveform 15 is coupled to the tap point *58a* via a capacitor 57. A relatively low resistance 56 is provided between the tap point *58a* and ground to produce a relatively low effective impedance across which the waveform 15 is seen by the following detector circuits 25. In the configuration shown in FIGURE 3 capacitor 57 is used merely to block the D.C. voltage developed across the cathode bias resistor 58 associated with the gated reference amplifier 32. In the event that an alternative configuration not involving a D.C. potential is used, the capacitor 57 could be short circuited and resistor 56 removed. The spirit of the invention merely calls for a relatively low impendance seen from the tap point *58a* to ground, and minor rearrangements of the type described will be obvious to those skilled in the art. It can be seen that during the picture waveform 15 the tap point *58a* follows the waveform 15, whereas windings 45 and 46 are introducing essentially constant sinusoidal components at the reference frequency generated by the crystal 19.

The chorminance signal must be extracted through a process of synchronous demodulation; i.e., the phase of the color subcarrier carried in the waveform 15 must be constantly compared to the phase of the reference signal derived from the crystal 19. More particularly, specific phase relationships uniquely corresponding to hue information as set forth in the aforementioned NTSC standards must be extracted. For example, a zero degrees phase relationship between the color subcarrier of the waveform 15 and the extended reference burst will correspond roughly to the hue yellow. Other phase relationships can be isomorphically related to other hues.

Figure 5:
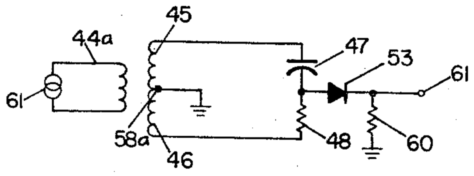
FIGURE 5 is a simplified circuit diagram of a reference signal phase shifter embodied in the system of FIGURE 3.
Figure 6:
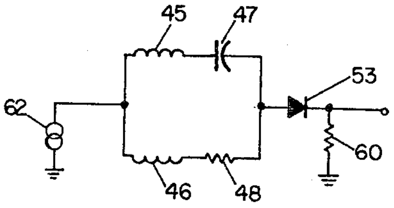
FIGURE 6 is a simplified circuit diagram showing the effect of the circuit of FIGURE 5 on the chroma signal of the system of FIGURE 1.

The manner in which synchronous detection of phase corresponding to selected primary hues is accomplished, can best be understood with reference to the simplified schematics of FIGURE 5 and FIGURE 6. In FIGURE 5 the source generator 61 represents the essentially constant sinusoidal output produced by the amplifier stage 42. The impedance to ground from the tap *58a* is rendered very low as described earlier, and can be assumed a short circuit to ground, as shown in the simplified schematic of FIGURE 5, since picture component 15 is not being considered.

When a series network consisting of a reactance 47 and a resistance 48 is connected from end to end across the secondary windings 45 and 46, and the junction of the series elements 47 and 48 is connected to a relatively high impedance load 60, the phase of voltage at the output terminal 61 with respect to the input voltage to the transformer, or with respect to ground, may be varied without significant accompanying amplitude variations by varying the relative values of the reactor 47 and the resistor 48. This, per se, is a well-known circuit and often employed in the art. Returning to FIGURE 3, it is seen that the choice of series components 51 and 52, can provide reference outputs into detectors 53, 54 and 55 of any selected phases, yet of equivalent amplitude.

The picture waveform 15 is processed through the equivalent circuit of FIGURE 6 in which a low impedance source generator 62 is substituted for the waveform source and the windings 45 and 46 represent the like elements of FIGURE 3. The load impedance 60 is chosen to be much larger than that imposed by any of the elements 45, 46, 47 or 48 at the color subcarrier frequency. Thus changes in the relative values of the phase-shifting components 47 and 48 have negligible effect upon the phase of the color subcarrier waveform 15, as seen at the detector elements 53, 54, and 55 of FIGURE 3. Accordingly, the relative values of phase-shifting elements such as 47 and 48 can be chosen to produce reference signal phases corresponding to the primary hues in the color system, and the implicit addition of the color signal waveform 15 with the selected reference phases as seen at the respective detectors 53, 54, and 55 will cause each detector to produce a maximum output only when a component of the color picture waveform 15 is in phase with, and thus maximally additive to, the reference phase selected for that detector.

If, for example, the resistive network 51, 52 of FIGURE 3 were chosen so that the detector 55 were to see a zero degrees relative shift in the reference signal, the detector 55 output would be maximum for yellow portions of the transmitted picture. Although three detectors 53, 54, and 55 are shown in FIGURE 3, it is evident that any number of detectors may be used and that sequencing among the various reference phases produced by networks such as 47 and 48, 49 and 50, or 51 and 52 can readily be effected.

The detectors 53, 54, and 55 in essence extract the summation envelope of the applied signals and, upon low-pass filtering by means of capacitors 63′ and 63″ produce the desired chrominance signal outputs comprised of frequencies between zero and roughly 600 kc.

'he latter signals are applied to a conventional chrominance signal amplifier 12 for application to the display ,evice 8 of FIGURE 1.

The circuits of the present invention using the tube onfiguration of FIGURE 3 or a transistorized equivalent ave been shown to yield highly stable operation with nusual simplicity and economy in construction. While have described and illustrated one specific embodiment f my invention, it will be clear that variations of the eneral arrangement and of the details of construction /hich are specifically illustrated and described may be esorted to without departing from the true spirit and cope of the invention.

What I claim is:

1. In a color television receiver, a chrominance amplifier, a gated reference amplifier in cascade with said chrominance amplifier, a phase splitter amplifier in cascade with said gated reference amplifier, said gated amplifier being normally disabled and responsive to enabling sync pulses, a ringing circuit connected intermediate said gated reference amplifier and said phase splitter amplifier for phase coherently extending in time signal received from said gated amplifier, and means responsive to said sync pulses for concurrently completing a positive feedback loop for said chrominance amplifier, to increase the gain and decrease the bandwidth thereof, and for cutting off said phase splitter amplifier.

2. In a color television receiver, a chrominance amplifier having a tank circuit tuned to a chrominance modulated color sub-carrier frequency and having a normally broad band characteristic encompassing the bandwidth of said chrominance modulated color sub-carrier, a ringing circuit resonant at said sub-carrier frequency, a gate coupling said chrominance amplifier with said ringing circuit, said gate being normally disabled, a source of bursts of reference color sub-carrier, means applying said reference bursts and chrominance modulated subcarrier to said chrominance amplifier in a composite signal, means enabling said gate during said bursts and for simultaneously decreasing the bandwidth of said chrominance amplifier toward that of said bursts so that each of said bursts is applied to said ringing circuit via said gate for phase coherent time extension thereof, and means responsive to the amplified chrominance modulated color subcarrier from said chrominance amplifier and to said time extended bursts from said ringing circuit for combination thereof, during the interval between successive bursts.

3. The combination according to claim 1 wherein said last means includes a positive feedback circuit for said chrominance amplifier, means normally disabling said positive feedback loop, and means responsive to said horizontal sync pulse for enabling said feedback loop.

4. In a color television receiver, circuitry for concurrent processing of chrominance modulated color subcarrier and reference bursts at the subcarrier frequency in a composite video signal, comprising means for amplifying said composite video signal, said amplifying means having a normally broad bandwidth sufficient to pass said color subcarrier with the modulated chrominance information, a normally disabled gating circuit coupled to receive the amplified composite video signal, a source of synchronization pulses for said receiver, said synchronization pulses coinciding at least approximately with the timing of said reference bursts in said composite signal, means for applying said synchronization pulses to said gating circuit for enabling said gating circuit to pass said reference bursts, means for regeneratively feeding said reference bursts from said gating circuit back to said amplifying means to increase the gain thereof and to reduce the bandwidth thereof to a value commensurate with the bandwidth of said reference burst, during intervals in which said gating circuit is enabled, a circuit tuned to the frequency of said subcarrier and responsive to said reference bursts passed by said gating circuit to convert said bursts to substantially sinusoidal steady state oscillations having frequency and phase coherence therewith, means for additively combining the amplified chrominance modulated color subcarrier with said substantially sinusoidal steady state oscillations during intervals between said synchronization pulses, and means for synchronously detecting the envelope of the low frequency color information from said combined signal.

5. The invention according to claim 4 wherein the last-named means synchronously detects said chrominance signal by comparison of the phase of said color subcarrier with the substantially sinusoidal oscillation to extract therefrom picture hue information uniquely identified by the phase relationships determined from said comparison.

6. The invention according to claim 4 wherein is included means for disabling said means for additively combining in response to application of said synchronization pulses to said gating circuit.

7. The invention according to claim 4 wherein said amplifying means comprises an amplifier having an input circuit and an output circuit, means for supplying said composite video signal to said input circuit, a resonant network in said output circuit tuned to the frequency of said color subcarrier and providing said normally broad bandwidth, and means coupling said resonant network to said gating circuit for application of said amplified composite video signal thereto; and wherein said gating circuit comprises an amplifier normally biased to cutoff and responsive to each of said synchronization pulses to assume a conductive state, and a circuit connected to the output circuit of the last-named amplifier and tuned to the frequency of said color subcarrier for passage of only said reference bursts upon assumption of said conductive state by said last-named amplifier; and wherein said tuned circuit for maintaining said bursts as substantially sinusoidal steady state oscillations having frequency and phase coherence with said bursts comprises a series resonant crystal filter.

8. The invention according to claim 7 wherein said means for additively combining comprises an amplifier having an input circuit connected to said crystal filter and having an output circuit including a resonant network tuned to the frequency of said color subcarrier, means coupled to the last-named resonant network for extracting an amplified version of said substantially sinusoidal oscillations therefrom, and means for introducing said color subcarrier containing chrominance information from said amplified composite video signal on said extracted amplified oscillations; and wherein is included means coupled to said gating circuit and responsive to said synchronization pulses for cutting off said amplifier of said means for addititively combining during the interval covered by each synchronization pulse.

9. The invention according to claim 8 wherein said last-named resonant network includes an inductor; said means for extracting said amplified oscillations comprising a tapped winding coupled to said inductor, and means applying said color subcarrier containing said chrominance information to a tap of said tapped winding; and phase shift elements connected to said tapped winding and having values selected to produce reference signal phases corresponding to predetermined hues in the color system for application to said synchronous detection means.

10. In a color television receiver having a display to which horizontal synchronization pulses are applied and having a video detector from which a composite video signal, including chrominance modulated color subcarrier and reference bursts at the subcarrier frequency, is derived, normally broadband means for amplifying the composite signal; means responsive to said synchronization pulses for extracting said reference bursts from the amplified composite signal, and for regeneratively applying the extracted bursts to said amplifying means to reduce the bandwidth and to increase the gain thereof; means responsive to the extracted and amplified reference bursts for frequency and phase coherent time extension thereof in the form of substantially continuous oscillations; means for combining the time extended bursts with the chrominance modulated color subcarrier of said amplified composite signal; means for disabling the last-named means during generation of each synchronization pulse; and means for synchronously detecting color information from the combined signal.

References Cited

UNITED STATES PATENTS

| | | | |
|---|---|---|---|
| 2,892,023 | 6/1959 | Davis | 178—5.4 |
| 2,894,061 | 7/1959 | Oakley et al. | 178—5.4 |
| 2,951,896 | 9/1960 | Schaefer | 178—5.4 |
| 3,133,987 | 5/1964 | Palladine | 178—5.4 |

DAVID G. REDINBAUGH, *Primary Examiner.*

J. A. O'BRIEN, *Assistant Examiner.*